United States Patent [19]

Myers

[11] Patent Number: 4,544,695
[45] Date of Patent: Oct. 1, 1985

[54] LOW MELTING PHOSPHATE-SULFATE GLASSES AS INTUMESCENT FLAME AND/OR SMOKE RETARDANTS FOR POLYMERS

[75] Inventor: Ronald E. Myers, Strongsville, Ohio

[73] Assignee: The B. F. Goodrich Company, Arkon, Ohio

[21] Appl. No.: 649,874

[22] Filed: Sep. 13, 1984

[51] Int. Cl.⁴ .................. C08K 3/30; C08K 3/32; C08L 27/06; C08L 27/08
[52] U.S. Cl. .................. 524/405; 106/18.14; 501/41; 501/45; 501/46; 501/47; 524/414; 524/415; 524/417; 524/418; 524/423; 524/430; 524/431; 524/432; 524/433; 524/416
[58] Field of Search ............. 524/492, 494, 106, 417, 524/423, 405, 414, 415, 416, 418, 430, 431, 432, 433; 501/24, 41, 45; 106/18.14

[56] References Cited

U.S. PATENT DOCUMENTS

| 4,136,082 | 1/1979 | Brady | 524/417 |
| 4,137,199 | 1/1979 | Brown et al. | 521/106 |
| 4,371,655 | 2/1983 | Kroenke | 524/423 |

*Primary Examiner*—Allan M. Lieberman
*Attorney, Agent, or Firm*—James R. Lindsay; Daniel J. Hudak

[57] ABSTRACT

A polymeric flame retardant composition comprises low melting temperature phosphate-sulfate glass compositions in an amount of from about 10 to about 100 parts by weight per 100 parts by weight of said polymer. Desirably, the polymer is a halogen-containing polymer. The phosphate-sulfate combination has been found to produce synergistic results.

12 Claims, No Drawings

1

LOW MELTING PHOSPHATE-SULFATE GLASSES AS INTUMESCENT FLAME AND/OR SMOKE RETARDANTS FOR POLYMERS

TECHNICAL FIELD

The present invention relates to flame and smoke retarded polymers having a low melting temperature phosphate-sulfate glass composition therein.

BACKGROUND ART

Heretofore, a number of recognized additives have been utilized as fire and/or smoke retardants in plastics or rubbers such as various metal oxides, for example zinc oxide, bismuth trioxide, molybdenum trioxide, litharge, vanadium pentoxide, tungstic oxide, cadmium oxide and antimony trioxide, various phosphorous compounds such as tricresyl phosphate, triphenyl phosphate, tributyl phosphate, tris(2-ethylhexyl)phosphate and tris(2,3-dichloropropyl)phosphate; various halogen containing compounds such as chlorinated waxes, antimony trihalides and antimony oxyhalides; and amine molybdates such as melamine molybdate, ammelimium beta-octamolybdate, dicyclohexylammonium alpha-octa-molybdate, didodecylammonium beta-octamolybdate and tripentylammonium decamolybdate.

Additionally, a variety of inorganic oxide glasses have heretofore been utilized such as a phosphate glass having a low softening point glass of Tg 300° C. and optional blowing agent which is utilized in a reinforced thermosetting polymer as set forth in U.S. Pat. No. 3,933,689.

U.S. Pat. No. 3,935,018 relates to inorganic oxide glasses containing various ratios of $P_2O_5$, $B_2O_3$, and PbO compounds.

U.S. Pat. No. 4,079,022 relates to treating the moisture sensitivity of glass used as the reinforcing agent as well as the fire retarding resin by treating the surface with an alkaline solution of magnesium, calcium, barium, iron, aluminum, lead or zinc compounds.

U.S. Pat. No. 4,371,665 relates to the utilization of various sulfate glasses having components such as potassium sulfate in a polymer as a smoke retardant.

U.S. Pat. No. 3,931,064 relates to an isocyanate-based polymeric foam material having dispersed therein a particulate low-softening point inorganic oxide glass having a transformation temperature of not greater than 300° C.

U.S. Pat. No. 4,137,199 relates to a mixture including an organic polymer and a phosphate glass.

However, none of the above patents relate to applicant's synergistic phosphate-sulfate glass composition.

DISCLOSURE OF INVENTION

It is therefore an aspect of the present invention to provide a flame and/or smoke retardant composition containing a low melting temperature phosphate-sulfate glass composition.

It is a further aspect of the present invention to provide a flame and/or smoke retardant composition, as above, wherein the average particle size of said glass composition is from about 0.1 micron to about 250 microns.

It is a still further aspect of the present invention to provide a flame and/or smoke retardant composition, as above, in which the polymer is usually a halogen-containing polymer.

These and other aspects of the present invention will become apparent from the following detailed specification.

In general, a flame and/or smoke retardant polymeric composition, comprising: a polymer, and from about 10 parts to about 100 parts by weight per 100 parts by weight of said polymer of a phosphate-sulfate low melting temperature glass composition.

BEST MODE FOR CARRYING OUT THE INVENTION

According to concepts of the present invention, the fire and/or smoke retardancy of various polymers are abated by incorporating therein low melting temperature phosphate-sulfate glass compositions.

Considering the polymers, they include polyvinylchloride, both rigid and plasticized, polyvinylidene chloride, polyolefins made from olefinic monomers containing from 2 to 12 carbon atoms, with specific examples including ethylene, propylene, isobutene, and 4-methylpent-1-ene, polyamides or nylons such as Nylon 66, Nylon 610, Nylon 11, and the like. Conventional polyesters such as polyethylene terephthalate and the like can also be utilized, as well as the various polyurethanes such as those made from diols and diisocyanates. Additionally, polychloroprene can be utilized. Also, polymers of acrylonitrile, either alone or with styrene, that is a copolymer, can be utilized. Polyvinylchloride and polyvinylidene chloride constitute preferred polymers.

Vinyl chloride polymers and vinylidene chloride polymers used in this invention include homopolymers, copolymers and blends of homopolymers and/or copolymers. The vinyl chloride polymers and vinylidene chloride polymers may contain from 0 to 50 percent of at least one other olefinically unsaturated monomer, more preferably from 0 to about 50 percent by weight of at least one other vinylidene monomer (i.e., a monomer containing at least one terminal $CH_2=C<$ group per molecule) copolymerized therewith, even more preferably from 0 to about 20 percent by weight of such vinylidene monomer. Suitable monomers include 1-olefins containing from 2 to 12 carbon atoms, more preferably from 2 to 8 carbon atoms, such as ethylene, propylene, 1-butene, isobutylene, 1-hexane, 4-methyl-1-pentene, and the like; dienes containing from 4 to 10 carbon atoms, including conjugated dienes such as butadiene, isoprene, piperylene, and the like; ethylidene norbornene and dicyclopentadiene; vinyl esters and allyl esters such as vinyl acetate, vinyl chloroacetate, vinyl propionate, vinyl laurate, alkyl acetate, and the like; vinyl aromatics such as styrene, alpha-methyl styrene, chlorostyrene, vinyl toluene, vinyl naphthalene, and the like; vinyl and allyl ethers and ketones such as vinyl methyl ether, allyl methyl ether, vinyl isobutyl ether, vinylbutyl ether, vinyl chloroethyl ether, methylvinyl ketone, and the like; vinyl nitriles such as acrylonitrile, methacrylonitrile, the like; cyanoalkyl acrylates such as alpha-cyanomethyl acrylate, the alpha-beta- and gamma-cyano-propyl acrylates, and the like; olefinically unsaturated carboxylic acids and esters thereof, including alpha, beta-olefinically unsaturated acids and esters thereof such as methyl acrylate, ethyl acrylate, chloropropylacrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate, and the like; and including esters of maleic and fumaric acid, and the like; amides of the alpha, beta-olefinically unsaturated carboxylic acids such as acryladmide, and the like, divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; and bis (beta-haloalkyl)alkenyl phosphonates such as bis(beta-chloroethyl)vinyl phosphonate, and the like. Also included are "post chlorinated" vinyl chloride and vinylidene chloride polymers.

The polyvinylchloride can be either rigid or plasticized. By rigid, it is meant that the polymer contains no plasticizer and is therefore a non-flexible material having relatively high glass transition temperature, high tensile strength, but low flexibility. In contrast thereto, plasticized polyvinylchloride is flexible in that it contains various plasticizers therein. The amount of plasticizers can range from about 1 part to about 100 parts by weight, with from about 1 part to about 80 parts generally being desired, based upon 100 parts by weight of the polymer. The types of plasticizers which can be utilized are well known to the art and literature, with representative examples including dioctylphthalate, tricresyl phosphate, and dibutyl sebacate.

The phosphate-sulfate glasses of the present invention should be of a small particle size, that is a powdery type material, in order to permit convenient processing of the flame and/or smoke retardant polymers. Accordingly, a powdery material having an average particle size of from about 0.1 micron to about 250 microns, with from about 1 micron to about 50 microns being preferred, is utilized. Such particle size can be achieved by various conventional methods as by grinding, or ball milling the glass composition until a desired particle size is obtained.

The phosphate-sulfate composition useful in the present invention is generally a glass or glass-ceramic material containing substantially sulfate and phosphate glass components therein, along with small amounts of other additives. Generally, the amount of phosphate glass, based upon the total amount of phosphate and sulfate glass components generally ranges from about 18 to about 60 mole percent and preferably from about 35 to about 60 mole percent. Representative examples of phosphate type glass components include $P_2O_5$, $H_3PO_4$ and $NH_4H_2PO_4$. Any conventional or common type of sulfate glass component can be utilized such as $K_2SO_4$ and $Na_2SO_4$, $ZnSO_4$, and various transition metal sulfates such as $NiSO_4$, and the like. The phosphate-sulfate composition of the present invention generally contains from about 82 to about 40 mole percent and preferably from about 65 to about 40 mole percent of a sulfate glass.

A specific suitable phosphate-sulfate composition contains at least the following types of compounds: from about 4 to about 18 mole percent of $K_2SO_4$, with from about 7 to about 10 mole percent being preferred, from about 8 to about 36 mole percent of a $ZnSO_4$, with from about 15 to about 25 percent being preferred, from about 4 to about 36 mole percent of $Na_2SO_4$, with from about 7 to about 10 mole percent being preferred, and from about 19 to about 56 mole percent of $P_2O_5$, with from about 25 to about 40 mole percent being preferred. This phosphorous-sulfate glass composition can also contain minor amounts of various other glass type additives such as from about 0 to about 25 mole percent of ZnO, with from about 5 to about 10 mole percent being preferred; from about 0 to about 4 mole percent of $B_2O_3$, with from about 2 to about 3 mole percent being preferred; from about 0 to about 25 mole percent of $Li_2O$, with from about 5 to about 20 mole percent being preferred; from about 0 about 25 mole percent of $Na_2O$, with from about 10 to about 20 mole percent being preferred; from about 0 to about 12 mole percent of BaO, with from about 3 to about 9 mole percent being preferred, and from about 0 to about 4 mole percent of $TiO_2$, with from about 2 to about 3 mole percent being preferred. Generally, such additives can be classified as being glass formers, modifiers or intermediate oxides. Such additives are known to affect the temperature range of glass formation, melt viscosity and chemical durability of the glass. For example, zinc oxide, sodium oxide, lithium oxide and barium oxide are classified as modifiers and as such would affect chemical durability and melt viscosity. Boron trioxide, a glass former, acts as a fluxing agent thereby providing control over melt viscosity and glass formation temperature. Titanium dioxide is an example of an intermediate oxide and is also well known as an oxide nucleation catalyst thereby providing glass-ceramic forming capabilities to the system.

With regard to the polymeric material, the amount of the phosphate-sulfate glass composition is generally from about 10 parts to about 100 parts by weight, based upon 100 parts of said polymer and desirably from about 10 parts to about 40 parts by weight.

The phosphate-sulfate glass composition is prepared by first grinding the various glass components and additives. That is, the particle size of the bulk glass is reduced to the range of from about 0.1 micron to about 250 microns and preferably from about 1 micron to about 50 microns by grinding the glass in a ball mill. For example, about 100 grams of bulk glass was placed into a 250 cc agate grinding bowl along with 20 ten mm agate grinding balls and 10 twenty mm agate grinding balls. The glass was then subjected to grinding using a ball mill, of the type manufactured by Tekmar Company (model 5/4 planetary ball mill) using a grinding time of 30 minutes. After loosening any caked glass, the glass powder was subjected to a final 30 minute grinding cycle to produce a free flowing powdered glass having the desired particle size. As an alternative to dry grinding, the glass can be ground as a slurry by using ethanol or a Freon such as Freon TF (supplied by Miller-Stephenson Chemical Co.). Slurry grinding does tend to minimize caking of the powdered glass.

The various desired amounts of glass components and additives are then added to a vessel capable of withstanding high temperatures such as porcelain and heated at a temperature of from approximately 480° to about 650° C. although higher or lower temperatures can be utilized. A clear melt is generally formed. The melt is then quenched at a temperature below the liquidus temperature of the melt as by pouring the melt rapidly onto a large aluminum plate maintained at room temperature. Depending upon the composition, usually a clear, colorless glass is formed.

The phosphate-sulfate glass composition is mixed with the polymer in any conventional manner such as by adding both on a roll mill or in a Banbury mixer or by extrusion. The components are then mixed at a temperature of from about 125° C. to about 200° C. for a suitable amount of time until the phosphate-sulfate glass composition is thoroughly dispersed within the polymer. The smoke and/or flame retardant polymer composition, in addition to the glass additives may contain various common or conventional compounding ingredients or additives such as processing aids, lubricants, fillers, stabilizers, plasticizers, impact modifiers, antioxidants, and the like.

The Goodrich Torch Test provides information concerning the thermal stability and insulative value of the char which forms when a vertically positioned sample is subjected to the flame from a propane torch. A 1½ square inch polymer test sample is positioned in the sample holder with a thermocouple connected to the back surface of the test sample. The propane torch is fitted with a pencil tip and is positioned at a distance relative to the front surface of the test sample such that the flame zone of the torch is no more than 1½ inches from the front surface of the test sample. The test configuration is arranged such that the test sample is the only barrier between the torch flame and the detecting thermocouple. The time to failure, designated as $t_f$, is defined as the time required for the thermocouple to register 250° C.

The phosphate-sulfate glass compositions of the present invention generally have a low melting temperature, that is as from about 500° C. or less. As a flame or other heat source heats the polymeric composition, glass generally expands and being oxidative resistant generally presents a heat resistant layer. Generally, an intumescent char is formed.

Although phosphate glasses tend to be water soluble and hygroscopic, and although sulfate glasses tend to be soluble in water as well as having a tendency to devitrify, a combination thereof surprisingly results in a composition which has a low or nil hydroscopic. Moreover, whereas the sulfate glasses of the type described in U.S. Pat. No. 4,371,655 generally tend to devitrify even when subjected to rapid quenching conditions, the phosphate-sulfate compositions of the present invention form as true glasses even in the absence of rapid quenching techniques.

The present invention will be better understood by reference to the following examples.

EXAMPLE 1

The following raw materials were ground together in the specified proportions to form a pulverized mixture:

| Compound | Weight (grams) |
| --- | --- |
| Potassium sulfate ($K_2SO_4$) | 27.27 |
| Zinc sulfate ($ZnSO_4H_2O$) | 56.16 |
| Sodium sulfate ($Na_2SO_4$) | 22.22 |
| Ammonium dihydrogen phosphate ($NH_4H_2PO_4$) | 134.91 |
| Zinc oxide (ZnO) | 7.96 |
| Lithium carbonate ($Li_2CO_3$) | 21.66 |

The resulting mixture was heated in a porcelain dish for one hour in a muffle furnace maintained at 600° C. A clear melt was formed. The melt was quenched to a temperature below the liquidus temperature of the melt by pouring the melt rapidly onto a large aluminum plate maintained at room temperature (25° C.). A non-hygroscopic, clear, colorless glass was formed having the composition:

| Component | Concentration (mole %) |
| --- | --- |
| $K_2SO_4$ | 9.7 |
| $ZnSO_4$ | 19.5 |
| $Na_2SO_4$ | 9.7 |
| $P_2O_5$ | 36.7 |
| ZnO | 6.1 |
| $Li_2O$ | 18.3 |

Forty parts by weight of a phosphate sulfate glass of the above composition was added to 100 parts by weight of polypropylene (Hercules Profax 6501) containing 0.5 php (parts per hundred of polymer) of Microthene 510. The glass was mixed with the polypropylene and the microthene in a blender and was then extruded at 200° C. In a similar manner, utilizing either no glass at all or various inert diluents as set forth in Table I, three other compositions were prepared. All of these compositions were then subjected to an oxygen index test (ASTM D 2863) and the following results were obtained:

TABLE I

|  | O.I. |
| --- | --- |
| Control - Profax 6501 | 17.5 |
| Example 1 - 40 php phosphate-sulfate glass | 19.0 |
| 40 php $CaCO_3$ | 17.5 |
| 40 php $BaSO_4$ | 17.5 |

As apparent from Table I, the phosphate-sulfate glass polymer formulation of the present invention achieved an oxygen index number which was greater than any of the controls. Moreover, a phosphate glass containing $P_2O_5$, ZnO and $Li_2O$ could not be processed with polypropylene as the phosphate glass severely degraded the polypropylene causing discoloration and decomposition of the polypropylene during the attempted extrusion. In contrast, the phosphate-sulfate glass was easily processed into the polypropylene.

EXAMPLE 2

The following raw materials were ground together in the specified proportions to form a pulverized mixture:

| Compound | Weight (grams) |
| --- | --- |
| Potassium sulfate ($K_2SO_4$) | 61.2 |
| Zinc sulfate ($ZnSO_4H_2O$) | 126.45 |
| Sodium sulfate ($Na_2SO_4$) | 49.95 |
| Ammonium dihydrogen phosphate ($NH_4H_2PO_4$) | 303.75 |
| Zinc oxide (ZnO) | 18.0 |
| Sodium carbonate ($Na_2CO_3$) | 69.75 |

The resulting mixture was heated in an alumina crucible for one hour in a muffle furnace maintained at 500° C. A clear, colorless melt formed. The melt was quenched to a temperature below the liquidus temperature of the melt by pouring the melt rapidly onto a large aluminum plate maintained at room temperature (25° C.). A glass was formed having a refractive index of 1.552, a specific gravity of 2.59 and having the following composition:

| Component | Concentration (mole %) |
| --- | --- |
| $K_2SO_4$ | 9.7 |

-continued

| Component | Concentration (mole %) |
|---|---|
| ZnSO₄ | 19.5 |
| Na₂SO₄ | 9.7 |
| P₂O₅ | 36.7 |
| ZnO | 6.1 |
| Na₂O | 18.3 |

Various amounts by weight of a glass of the above composition was milled into a plasticized PVC recipe (control) having the following formulation:
Geon 103 EP: 100 parts
DOP (dioctylphthalate): 40 parts The glass-filled plasticized PVC composition was subjected to the Goodrich smoke-char test (described in U.S. Pat. No. 4,234,472) NBS smoke chamber (ASTM E 662-79), the Oxygen Index Test and the Goodrich Torch Test. The following results were obtained:

| GOODRICH SMOKE CHAR TEST | | |
|---|---|---|
| | % Backbone Char | % Increase in Char |
| Control | 20.7 ± 7 | — |
| 10 php phosphate-sulfate glass | 25.7 ± 2.6 | 24 |

| NBS SMOKE CHAMBER (FLAMING MODE, 20 MILS) | | |
|---|---|---|
| | Dm/g | % Smoke Reduction |
| Control | 79 ± 7 | — |
| 10 php phosphate-sulfate glass | 68 ± 2 | 14 |

| OXYGEN INDEX | |
|---|---|
| | O.I. |
| Control | 24.0 |
| 10 php phosphate-sulfate glass | 24.5 |
| 20 php phosphate-sulfate glass | 25.0 |
| 40 php phosphate-sulfate glass | 26.0 |

| TORCH TEST | |
|---|---|
| | $t_f$ (seconds) |
| Control | 23 |
| 10 php phosphate-sulfate glass | 110 |
| 80 php phosphate-sulfate glass | 358 |

As apparent from the above data, the amount of char was increased, the amount of smoke reduced, the oxygen index showed an increase and the torch test showed a dramatic improvement in burn through time resistance.

EXAMPLE 3

The following raw material were used:

| Compound | Weight (grams) |
|---|---|
| Potassium sulfate (K₂SO₄) | 51.0 |
| Zinc sulfate (ZnSO₄H₂O) | 138.45 |
| Sodium sulfate (Na₂SO₄) | 119.50 |
| Phosphoric acid (85% H₃PO₄) | 253.75 |

The solid components were ground together in the specified proportions to form a pulverized mixture. The phosphoric acid was then added to the mixture of the sulfates to form a slurry. This slurry was then heated in a porcelain dish for one hour in a muffle furnace maintained at 600° C. for the first thirty minutes and at 700° C. for the second thirty minutes. The clear, yellow-tinted melt was quenched to a temperature below the liquidus temperature of the melt by pouring the melt rapidly on to a large aluminum plate maintained at room temperature (25° C.). A clear, colorless glass was formed having a specific gravity of 2.74 and having the following composition:

| Component | Concentration (mole %) |
|---|---|
| K₂SO₄ | 9.7 |
| ZnSO₄ | 25.6 |
| Na₂SO₄ | 28.0 |
| P₂O₅ | 36.7 |

Various amounts of the above glass composition was milled into a phosphate plasticized PVC recipe (control) having the following formulation:
Geon 103EP: 100 parts
K-100 tri(isopropyl phenyl) phosphate: 50 parts
R-4150 barium/cadmium/zinc phosphite: 3 parts
E-82 epoxidized soy bean oil: 1 part The glass-filled plasticized PVC composition set forth above was then subjected to a smoke-char test as well as a torch test. The following results were obtained:

| SMOKE-CHAR TEST | | | | |
|---|---|---|---|---|
| | Smoke/g sample | % Smoke Red. | % Char | % Increase in Char |
| PVC control | 196 | — | 4.2 | — |
| 25 php (phosphate-sulfate glass) | 143 | 27 | 13.2 | 214 |
| 50 php (phosphate-sulfate glass) | 107 | 45 | 22.8 | 443 |
| 25 php BaSO₄ | 184 | 6 | 13 | 214 |
| 50 php BaSO₄ | 161 | 18 | 23 | 443 |

| TORCH TEST (72 mils thick) | |
|---|---|
| | $t_f$ (seconds) |
| PVC control | 299 |
| 25 php (phosphate-sulfate glass) | 454 (much intumescence hard glassy char) |
| 25 php (sulfate glass)* | 267 |
| 25 php BaSO₄ | 163 |
| 25 php pure phosphate glass** | 390 |

*This is a sulfate glass made according to Example 2 of U. S. Pat. No. 4,371,655.
**This is a phosphate glass mentioned in U. S. Pat. No. 3,935,018, Example 1.

Utilizing the same phosphate-sulfate glass composition as set forth above, another control was made utilizing 100 parts by weight of Estane 58202 Black, a flame retardant thermoplastic polyurethane. Utilizing the Estane as a control, as well as adding various parts by weight of the above-identified Example 3 phosphate-sulfate glass thereto or other compounds, the following torch tests were conducted.

TORCH TEST (70 mils thick)

|  | $t_f$(seconds) | Oxygen Index |
|---|---|---|
| Estane control | 67 | |
| 25 php phosphate-sulfate glass | 154 | |
| 50 php phosphate-sulfate glass | 252 | |
| 25 php (CaCO$_3$) | 121 | |
| 50 php (CaCO$_3$) | 164 | |

Additionally, the phosphate-sulfate glass was added in various amounts to a rigid PVC recipe having the following formulation:
Geon 103 EP: 100 parts
Microthene 510: 2 parts
S-8 Stabilizer: 2 parts The phosphate-sulfate glass of the present invention was incorporated into the rigid PVC and compared with other compounds incorporated into the same polymer. The torch test was conducted and the following results obtained:

TORCH TEST (75 + 5 mils thick)

|  | $t_f$(seconds) |  |
|---|---|---|
| Rigid PVC control | 51 | |
| 10 phr BaSO$_4$ | 164 | |
| 25 php BaSO$_4$ | 211 | |
| 40 php BaSO$_4$ | 282 | |
| 10 php phosphate-sulfate glass | 556 | very pronounced |
| 25 php phosphate-sulfate glass | >720 | intumescent effect |
| 50 php phosphate-sulfate glass | >720 | hard, glassy char |
| 10 php sulfate-glass* | 266 | |
| 25 php sulfate-glass* | 316 | |
| 50 php sulfate-glass* | 270 | |

*This is a sulfate glass made according to Example 2 of U.S. Pat. No. 4,371,655.

EXAMPLE 4

The following raw materials were ground together in the specified proportions to form a pulverized mixture:

| Compound | Weight (grams) |
|---|---|
| Potassium sulfate (K$_2$SO$_4$) | 27.2 |
| Zinc sulfate (ZnSO$_4$H$_2$O) | 56.0 |
| Sodium sulfate (Na$_2$SO$_4$) | 22.4 |
| Ammonium dihydrogen phosphate (NH$_4$H$_2$PO$_4$) | 375.2 |
| Boron Oxide (B$_2$O$_3$) | 8.0 |
| Lithium carbonate (Li$_2$CO$_3$) | 17.2 |
| Barium carbonate (BaCO$_3$) | 68.8 |

The resulting mixture was heated in an alumina crucible for one hour in a muffle furnace maintained at 600° C. A clear, colorless melt formed. The melt was quenched to a temperature below the liquidus temperature of the melt by pouring the melt rapidly onto a large aluminum plate maintained at room temperature (25° C.). A glass was formed having water solubility of 5.7 percent and having the following composition:

| Component | Concentration (mole %) |
|---|---|
| K$_2$SO$_4$ | 5.3 |
| ZnSO$_4$ | 10.6 |
| Na$_2$SO$_4$ | 5.3 |
| P$_2$O$_5$ | 55.3 |
| B$_2$O$_3$ | 3.9 |

-continued

| Component | Concentration (mole %) |
|---|---|
| Li$_2$O | 7.9 |
| BaO | 11.8 |

The water solubility of the phosphate-sulfate glasses of the present invention, as shown by the above data, are thus much lower than a conventional phosphate glass or a conventional sulfate glass.

The torch test is an important test in that it gives a fairly accurate result with regard to burn-through time or resistance to high heat or a flame. As apparent from the various examples, the phosphate-sulfate compositions of the present invention have very good torch test results, often several times that of the control. The reason for the large increase is the intumescent effect caused by char formation and the formation of an insulated barrier.

The improved flame and/or smoke retardant polymer compositions of the present invention can be utilized wherever smoke or fire resistant properties are desirable as in carpets, house siding, plastic components for aircraft and passenger car interiors, wall coverings, coatings for wire and cable, interior house and office trim, and the like.

The phosphate-sulfate glasses of the present invention can also be used to prepare a transparent PVC composition in that the refractive index of the glass (1.55) matches that of the PVC resin (1.55). The phosphate-sulfate glasses can also be added to the polymer in the form of fibers thereby achieving, in addition to flame retardance, enhancement of the mechanical strength of the polymer composition.

While in accordance with the patent statutes, a preferred embodiment and best mode has been set forth in detail, the scope of the invention is limited by the scope of the attached claims.

What is claimed is:

1. A flame and/or smoke retardant polymeric composition, comprising:
    (a) a polymer selected from the group consisting of a rigid or plasticized polyvinylchloride, a polyvinylidene chloride, a polyolefin wherein said olefin is made from monomers having from 2 to 12 carbon atoms, a polychloroprene, a polyamide, a polyester, a polyurethane, polymers of acrylonitrile alone or with styrene, and combinations thereof, and
    (b) from about 10 parts to about 100 parts by weight per 100 parts by weight of said polymer of a phosphate-sulfate low melting temperature glass composition having an average particle size of from about 0.1 micron to about 250 microns, the amount of phosphate glass component based upon the total amount of phosphate glass component and sulfate glass component in said glass composition being from about 18 to about 60 mole present and the amount of said sulfate glass component in said glass composition is from about 82 to about 40 mole percent of the total amount of phosphate glass component and sulfate glass component in said glass composition.

2. A flame and/or smoke retardant polymeric composition according to claim 1, wherein the amount of said phosphate-sulfate glass composition ranges from about 10 parts to about 50 parts by weight per 100 parts by weight of said polymer.

3. A flame and/or smoke retardant polymeric composition according to claim 1, wherein said particle size ranges from about 1 to about 50 microns.

4. A flame and/or smoke retardant polymeric composition according to claim 1, wherein said sulfate glass components are selected from the group consisting of potassium sulfate, zinc sulfate, sodium sulfate, and combinations thereof, and wherein said phosphate is derived from the group consisting of $P_2O_5$, $H_3PO_4$, $NH_4H_2PO_4$, and combinations thereof.

5. A flame and/or smoke retardant polymeric composition according to claim 1, wherein said polymer is polyvinylchloride.

6. A flame and/or smoke retardant polymeric composition according to claim 1, wherein said polymer is polyvinylchloride, and wherein said polymeric composition contains from about 1 to about 80 parts by weight of a plasticizer.

7. A flame and/or smoke retardant polymeric composition according to claim 4, wherein said polymer is polyvinylchloride.

8. A flame and/or smoke retardant polymeric composition according to claim 4, wherein said phosphate-sulfate glass composition contains the following components:

| COMPONENT | MOLE PERCENT |
|---|---|
| $K_2SO_4$ | 4 to 18 |
| $ZnSO_4$ | 8 to 36 |
| $Na_2SO_4$ | 4 to 18 |
| $P_2O_5$ | 19 to 56 |
| ZnO | 0 to 25 |
| $B_2O_3$ | 0 to 4 |
| $Li_2O$ | 0 to 25 |
| $Na_2O$ | 0 to 25 |
| BaO | 0 to 12 |
| TiO | 0 to 4 |

9. A phosphate-sulfate glass composition for imparting improved flame and/or smoke retardant properties to a polymer selected from the group consisting of a rigid or plasticized polyvinylchloride, a polyvinylidene chloride, a polyolefin wherein said olefin is made from monomers having from 2 to 12 carbon atoms, a polychloroprene, a polyamide, a polyester, a polyurethane, polymers of acrylonitrile alone or with styrene, and combinations thereof, said composition comprising from about 18 to about 60 mole percent of phosphate glass components and from about 82 to about 40 mole percent of sulfate glass components, said glass composition having an average particle size of from about 0.1 to about 250 microns.

10. A phosphate-sulfate glass composition for imparting improved flame and/or smoke retardant properties to a polymer according to claim 9, wherein said composition contains the following components:

| COMPONENT | MOLE PERCENT |
|---|---|
| $K_2SO_4$ | 4 to 18 |
| $ZnSO_4$ | 8 to 36 |
| $Na_2SO_4$ | 4 to 18 |
| $P_2O_5$ | 19 to 56 |
| ZnO | 0 to 25 |
| $B_2O_3$ | 0 to 4 |
| $Li_2O$ | 0 to 25 |
| $Na_2O$ | 0 to 25 |
| BaO | 0 to 12 |
| TiO | 0 to 4. |

11. A phosphate-sulfate glass composition for imparting improved flame and/or smoke retardant properties to a polymer according to claim 10, wherein said phosphate-sulfate glass particle size is from about 1 to about 50 microns.

12. A phosphate-sulfate glass composition for imparting improved flame and/or smoke retardant properties to a polymer according to claim 11, wherein the amount of said $K_2SO_4$ is from about 7 to about 10 mole percent; the amount of said $Z_nSO_4$ is from about 15 to about 25 mole percent; the amount of said $Na_2SO_4$ is from about 7 to about 10 mole percent; the amount of said $P_2O_5$ is from about 25 to about 40 mole percent; the amount of said ZnO is from about 5 to about 10 mole percent; the amount of said $B_2O_3$ is from about 2 to about 3 mole percent; the amount of said $Li_2O$ is from about 5 to about 20 mole percent; the amount of said BaO is from about 3 to about 9 mole percent; the amount of said TiO is from about 2 to about 3 mole percent; and the amount of said $Na_2O$ is from about 10 to about 20 mole percent.

* * * * *